(12) United States Patent  
Srivastava

(10) Patent No.: US 8,994,661 B2
(45) Date of Patent: Mar. 31, 2015

(54) USER INTERFACE DEVICE HAVING CAPACITIVE TRACKBALL ASSEMBLY

(75) Inventor: Apoorv Srivastava, Franklin Park, NJ (US)

(73) Assignee: Google Technology Holdings LLC, Mountain View, CA (US)

( * ) Notice: Subject to any disclaimer, the term of this patent is extended or adjusted under 35 U.S.C. 154(b) by 96 days.

(21) Appl. No.: 13/538,108

(22) Filed: Jun. 29, 2012

(65) Prior Publication Data

US 2014/0002362 A1    Jan. 2, 2014

(51) Int. Cl.
G06F 3/033 (2013.01)
G06F 3/0362 (2013.01)

(52) U.S. Cl.
CPC .................... *G06F 3/0362* (2013.01)
USPC .......................................................... 345/167

(58) Field of Classification Search
USPC .......................................................... 345/167
See application file for complete search history.

(56) References Cited

U.S. PATENT DOCUMENTS

| 5,767,841 | A * | 6/1998 | Hartman ...................... 345/167 |
| 5,920,307 | A * | 7/1999 | Blonder et al. ............... 345/167 |
| 7,710,397 | B2 | 5/2010 | Krah et al. |
| 2003/0063073 | A1 * | 4/2003 | Geaghan et al. .............. 345/173 |
| 2008/0036734 | A1 * | 2/2008 | Forsblad et al. .............. 345/156 |
| 2008/0150903 | A1 | 6/2008 | Chuang |
| 2009/0015559 | A1 * | 1/2009 | Day et al. ...................... 345/167 |
| 2010/0023895 | A1 | 1/2010 | Benko et al. |
| 2010/0033432 | A1 * | 2/2010 | Sutton et al. .................. 345/167 |
| 2011/0141052 | A1 * | 6/2011 | Bernstein et al. ............. 345/174 |

FOREIGN PATENT DOCUMENTS

| EP | 0729112 A2 | 8/1996 |
| GB | 2354572 A | 3/2001 |
| GB | 2462434 A | 2/2010 |

(Continued)

OTHER PUBLICATIONS

Patent Cooperation Treaty, International Search Report and Written Opinion of the International Searching Authority for International Application No. PCT/US2013/047738, Sep. 9, 2013, 7 pages.

(Continued)

*Primary Examiner* — Kent Chang
*Assistant Examiner* — Mark Edwards
(74) *Attorney, Agent, or Firm* — Morris & Kamlay LLP

(57) ABSTRACT

A user interface device (100) includes a capacitive trackball assembly (108) having a conductive trackball (110) and one or more conductive plates (210, 310, 410, 510, 610) proximate to a surface of the conductive trackball (110), thereby enabling the conductive trackball assembly (108) to operate as a capacitive touch sensor. Each user contact point with the conductive trackball (110) modifies the effective capacitance of the conductive trackball assembly (108). The user interface device (100) senses the effective capacitance of the conductive trackball assembly (108) to discern the number of user contact points on the conductive trackball (110) and uses this information, along with other parameters, such as a concurrent sensed rotation vector of the conductive trackball (110), to identify a user command intended by the user. The identified user command may be transmitted to a controlled system (740) to effectuate or modify an operation at the controlled system (740).

21 Claims, 11 Drawing Sheets

(56) References Cited

FOREIGN PATENT DOCUMENTS

| JP | 2004094450 A | 3/2004 |
|----|--------------|--------|
| WO | 2008030563 A1 | 3/2008 |

OTHER PUBLICATIONS

Apple Inc., "Magic Mouse", http://www.apple.com/magicmouse/, accessed Jun. 29, 2012, 3 pages.

EZ@Home Technology Inc., "EZCommander", http:/www.jr.com/home-tech/pe/HMT_EZCOMMANDER/, accessed Jun. 29, 2012, 3 pages.

Kensington Computer Group, "Quartet Device Remote Control 84503", http://www.beachaudi.com/Kensington/84503-p-516349/html, accessed Jun. 29, 2012, 7 pages.

Sony Electronics Inc., "Sony NSZ-GS7 Review", http://reviews.cnet.com/digital-media-receivers/sony-nsz-gs7/4505-6739_7-35118320.html, Jun. 24, 2012, 24 pages.

Samsung, "Samsung's New Dual-Sided QWERTY Remote for Smart TV's Revealed by the FCC", http:/engadget.com/2011/01/27/samsungs-new-dual-sided-qwerty-remote-for-smart-tvs/, Jan. 27, 2011, 6 pages.

\* cited by examiner

USER INTERFACE DEVICE HAVING CAPACITIVE TRACKBALL ASSEMBLY

FIELD OF THE DISCLOSURE

The present disclosure relates generally to user-machine interfaces and more particularly to user interface devices.

BACKGROUND

Advances in graphical user interface (GUI) techniques have the potential to allow users to more fully interact with the devices they control. However, the hardware that provides the interface between the user and the device often limits the user's ability to fully exploit GUI features. Traditional button-festooned remote control devices typically are non-intuitive and require the user to look away from the displayed GUI and spend considerable time searching for the desired combination of keys needed to implement a desired command. Integration of multitouch displays in remote control devices and other user interface devices has improved user interaction, but such displays still typically require the user to switch focus from the displayed GUI to the multitouch display of the user interface device to implement certain commands. Moreover, the cost of implementing multitouch displays in the user interface device renders such an approach impracticable for many consumer devices, such as televisions and set-top boxes.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The following description is intended to convey a thorough understanding of the present disclosure by providing a number of specific embodiments and details involving a user interface device implementing a capacitive trackball assembly to support multitouch-based user commands. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the invention for its intended purposes and benefits in any number of alternative embodiments, depending upon specific design and other needs.

FIGS. 1-11 illustrate a user interface device and corresponding techniques for supporting trackball-based multitouch user commands. The user interface device includes a capacitive trackball assembly having a conductive trackball and one or more conductive plates proximate to (that is, near but not in direct electrical contact with) a surface of the conductive trackball, thereby enabling the conductive trackball assembly to operate as a capacitive touch sensor. Each user contact point with the conductive trackball (e.g., each finger in contact with the conductive trackball) modifies the effective capacitance of the conductive trackball assembly. The user interface device therefore can utilize the sensed effective capacitance of the conductive trackball assembly to discern the number of user contact points on the trackball and use this information, along with other parameters, such as a concurrent sensed rotation vector of the trackball, to identify a user command intended by the user. The identified user command then may be transmitted to a controlled system so as to effectuate or modify at the controlled system an operation responsive to the transmitted user command.

Because a user's typical approach to manipulating a trackball is through the user's fingers, the user contact points will be described herein in the example context of fingers in contact with the conductive trackball. However, reference to a finger in contact with the conductive trackball also includes reference to other types of user contact, such as a contact point via the user's palm, wrist, blade of hand, and the like.

Figure 1:
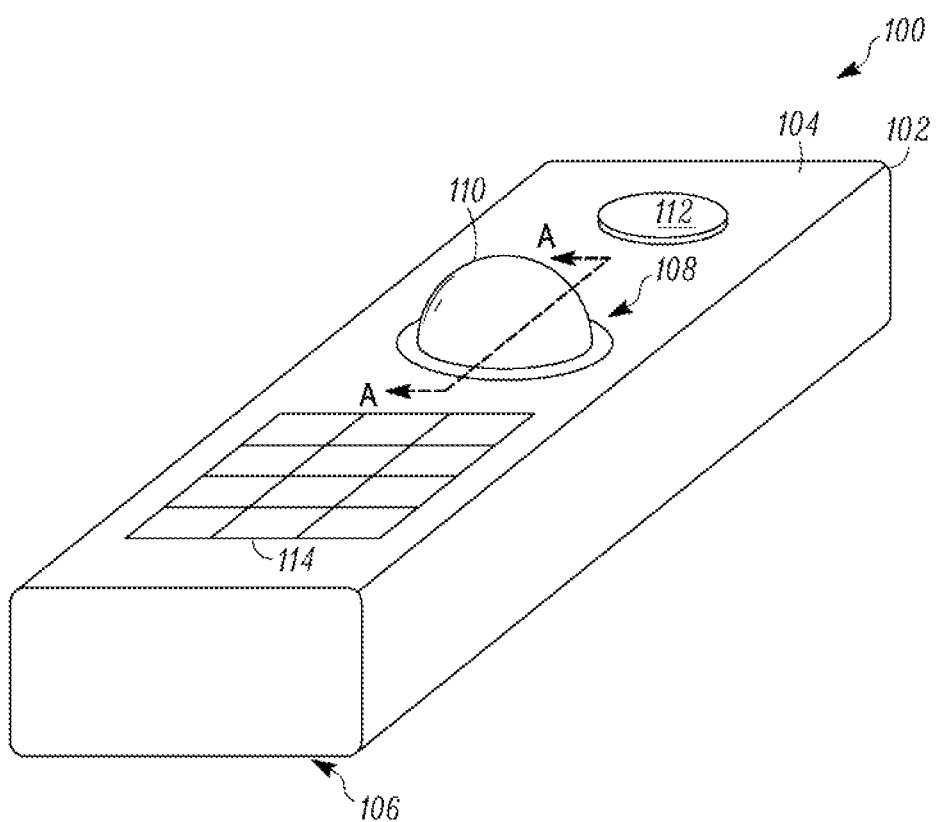
FIG. 1 is a perspective view of a user interface device implementing a capacitive trackball assembly supporting multitouch-based user commands in accordance with at least one embodiment of the present disclosure.

FIG. 1 illustrates a user interface device 100 employing a capacitive trackball assembly to support multitouch user commands in accordance with at least one embodiment of the present disclosure. The user interface device 100 can include any of a variety of user-manipulated devices that facilitate a user's interaction with, or control of, a system. Examples of such devices include, but are not limited to, a remote control device (such as a television remote, a set-top box remote, or a gaming system remote), a computer mouse or mouse/keyboard combination, a personal digital assistant (PDA), a computing-enabled cellular phone device (also referred to as a "smart phone"), a tablet computer or notebook computer, and the like.

In the depicted example, the user interface device 100 includes a housing 102 having a surface 104 opposite another surface 106. For ease of reference, the surface 104 is referred to herein as the "top surface" 104 and the surface 106 is referred to herein as the "bottom" surface 106, although the orientation of these surfaces is not limited by these relational designations. In the example rectangular block form-factor depicted, the surfaces 104 and 106 are substantially parallel and the housing 102 further includes four side surfaces (front, back, left, and right) between the top surface 104 and the bottom surface 106. Of course, the housing may be implemented in many other form factors, including more curved, or domed, or ergonomic shapes.

The user interface device 100 includes a user-manipulable control in the form of a capacitive trackball assembly 108. The capacitive trackball assembly 108 includes a conductive trackball 110 and one or more conductive plates (not shown in FIG. 1) proximate to a surface of the conductive trackball 110. The term "conductive," as used herein, means electrically conductive. Each conductive plate partially or fully encircles one or more latitudes of the conductive trackball 110 and is separated from a conductive material or conductive layer of the conductive trackball 110 by an air gap or other dielectric so as to enable charge storage, and thus a voltage potential, between the conductive trackball 110 and the one or more conductive plates. In this manner, the capacitive trackball assembly 108 may act as a capacitive touch sensor having a capacitance $C_T$ when the conductive trackball 110 is not in contact with a user.

To facilitate rotation about two axes, the conductive trackball 110 may be implemented as a spherical shape. Alternatively, when movement is limited to one axis of rotation, the conductive trackball may be implemented in a spheroid shape or a circular, or "wheel" shape. The terms "ball" and "trackball", as used herein, refer to spherical, spheroid, and circular, or "wheel", shapes unless otherwise noted. The conductive trackball 110, in one embodiment, is formed as a non-conductive core enveloped by one or more layers of metal or other conductive material. Alternatively, the conductive trackball 110 may be a solid ball of conductive material or a hollow ball composed of conductive material.

The conductive trackball 110 extends through an opening in the top surface 104 so that a top hemispherical portion is accessible for contact and manipulation by a user's fingers at the top surface 104. Further, the conductive trackball 110 also can extend through an opening in the bottom surface 106 so that a bottom hemispherical portion is accessible to contact and manipulation by a user's fingers at the bottom surface 106. In other embodiments, the conductive trackball 110 also may be accessible via one or more sides of the housing 102. The capacitive trackball assembly 108 is coupled to a capacitive sense circuit (not shown in FIG. 1) to sense an effective capacitance (or a change in effective capacitance) resulting from a user's manipulation of the conductive trackball. In at least one embodiment, the capacitive sense circuit employs a number of capacitive threshold levels that reflect the number of user contact points with the conductive trackball 110.

The capacitive trackball assembly 108 also includes a rotation sensor (not shown in FIG. 1) to sense a rotation of the capacitive trackball 110 about one or more axes of rotation due to user manipulation. From this, the user interface device 100 can implement a multitouch command scheme based on the sensed number of fingers in contact with the capacitive trackball 110 and a rotation vector of the capacitive trackball 110 concurrent with the user contact. Example configurations of the capacitive trackball assembly 108 are described in greater detail below with reference to the cross-section views at line A-A of the user interface device 100 as depicted by FIGS. 2 and 3.

The user interface device 100 also can include one or more other types of user-manipulable controls located at one or more surfaces of the housing 102. In the illustrated example, the user-manipulable control includes a push-button 112 and a key pad 114 located at the top surface 104. Other user-manipulable controls can include, for example, switches, toggles, trigger buttons, touch pads, and the like, and which may be located on one or both of the top surface 104 and the bottom surface 106. The user command generated by the user interface device 100 also may take into account the user's manipulation of these other controls in addition to the user's manipulation of the conductive trackball 110.

Although FIG. 1 illustrates an example form-factor for the user interface device 100, any of a variety of form-factors may be employed without departing from the scope of the present disclosure. For example, rather than locate the openings in the top and bottom surfaces of the housing 102 such that the exposed hemispherical portions are perpendicular to the ground when the user interface device 100 is held by a user in the orientation shown, the openings in the housing 102 may be oriented on opposing sides of the user interface device 100 such that the exposed hemispherical portions are parallel with the ground when the user interface device 100 is held by a user in the orientation shown. Further, rather than being an elongated block form factor intended for being held in a user's single hand, the user interface device 100 can include a form factor intended to be placed on a surface while being manipulated by a user (such as a keyboard form factor, a notebook form factor, or a trackball mouse form factor), a form-factor intended to be embedded in another device (e.g., a trackball mouse integrated into the keyboard of a notebook computer, or a form-factor intended to be held by two hands of a user (such as a video game control controller form factor or tablet computer form factor)).

Figure 2:
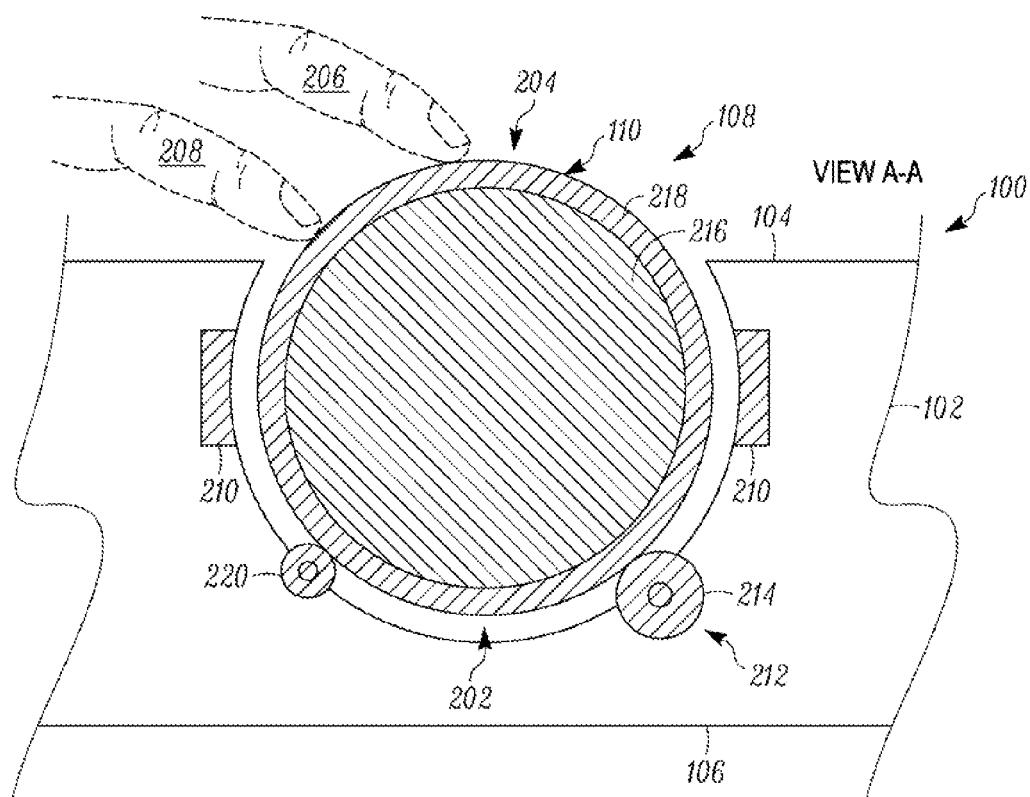
FIG. 2 is a cross-section view of a portion of the user interface device with a capacitive trackball assembly in accordance with at least one embodiment of the present disclosure.
Figure 3:
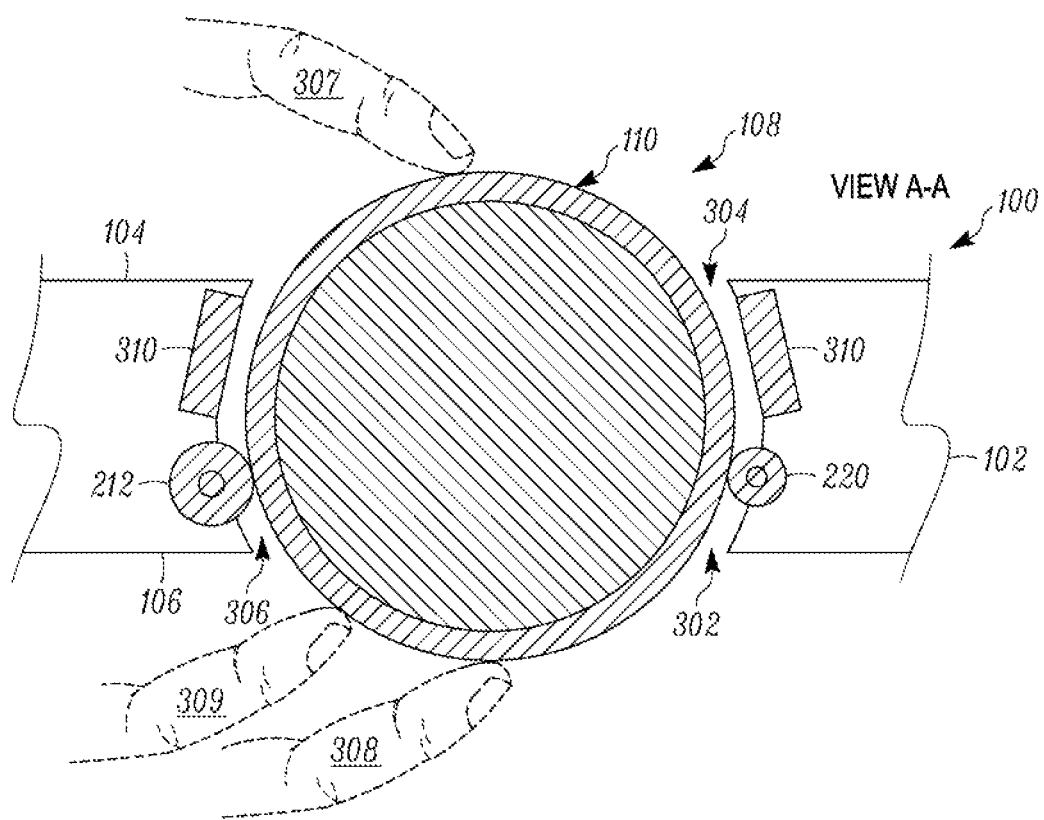
FIG. 3 is a cross-section view of a portion of the user interface device with a capacitive trackball assembly in accordance with an alternative embodiment of the present disclosure.

FIGS. 2 and 3 illustrate cross-section views along line A-A of FIG. 1 of alternative implementations of the user interface device 100. The form factor depicted in FIG. 2 permits the conductive trackball 110 to be manipulated on only a single side and is well suited for uses whereby the user interface device 100 is stationed on a workspace, such as a desk, implemented in a keyboard, stationary mouse, or other stationary user interface, or when held by a user with the user's thumb serving as the primary form of manipulating the conductive trackball 110. The form factor depicted in FIG. 3 permits the conductive trackball to be manipulated on two opposing sides and is well suited for uses whereby the user interface device 100 is intended to be held aloft by the user during use, such as for use as a remote control device for a television or set-top box.

In the depicted example of FIG. 2, the capacitive trackball 110 is positioned in a cavity 202 of the housing 102 that encloses a portion of the capacitive trackball 110. The cavity 202 includes a single opening 204 (shown at the top surface 104) in the housing 102, through which a hemispherical portion of the conductive trackball 110 extends so as to permit manipulation of the conductive trackball 110 by one or more fingers 206, 208 of a user. In at least one embodiment, the cavity 202 extends beyond the equator of the capacitive trackball 110 and the opening 204 of the cavity 202 is smaller than the diameter of the conductive trackball 110 so that the conductive trackball 110 would be maintained in the cavity 202 in the event that the user interface device 100 was inverted.

Disposed in the cavity 202 are one or more conductive plates 210 that are proximate to the surface of the conductive trackball 110. The one or more conductive plates 210 are separated from a conductive surface or layer of the conductive trackball 110 by one or more dielectric layers so that an electric field may be formed between the conductive plate 210 and the conductive trackball 110. The one or more conductive plates 210 can use one or more layers of any of a variety of conductive materials, such as aluminum, copper, gold, silver, or other metal, and may include one or more non-conductive layers, such as an aluminum band supported by a plastic backing. The one or more dielectric layers can include, for example, an air gap, one or more dielectric coatings on the surfaces of the conductive plates 210 facing the conductive trackball 110, one or more dielectric coatings on the surface of the conductive trackball 110, a dielectric material affixed to a surface of the conductive plate facing the conductive trackball 110, or combinations thereof.

The conductive plate 210 may circumscribe the entire circumference of a latitude of the conductive trackball 110. For example, in the depicted example, the conductive plate 210 is a complete ring that circumscribes the conductive trackball 110 at an equator of the conductive trackball 110. In other embodiments, the conductive plate 210 may extend along only a portion of the circumference of a latitude of the conductive trackball 110. For example, as described below in greater detail with reference to FIG. 6, rather than using a single, uninterrupted conductive ring that encircles the conductive trackball, the user interface device 100 instead could employ multiple physically separate ring segments that together circumscribe the conductive trackball 110. Further, the conductive trackball 110 may be only partially encircled by a conductive plate. For example, rather than encircling an entire circumference of the conductive trackball 110, the conductive plate 210 instead could include a curved plate that extends along, for example, only 30 degrees of the circumference at a given latitude or the conductive plate 210 may have a substantially flat plate in proximity to the surface of the conductive trackball 110. Alternatively, the conductive plate 210 could employ a spiral shape so as to spiral around the conductive trackball 110 within the cavity 202. Moreover, while FIG. 2 depicts a conductive plate 210 at a single latitude of the conductive trackball 110, multiple conductive plates at different latitudes of the conductive trackball 110 could be implemented.

Also disposed in the cavity 202 are one or more motion sensors 212 of a rotation sensor assembly (not shown in FIG. 2) used to detect a rotation of the conductive trackball 110. The motion sensors 212 can include, for example, rollers engaged with the surface of the capacitive trackball 110 and which manipulate a pulsed light mechanism when the capacitive trackball 110 is rolled in the direction of orientation of the roller as is well known in the art. In the depicted example, the motion sensor 212 includes a roller 214 positioned so as to detect a motion of the conductive trackball 110 about the x-axis (that is, the yaw of the conductive trackball 110). The user interface device 100 typically would also include another motion sensor 212 having a roller positioned at 90 degrees relative to the roller 214 so as to detect a motion of the conductive trackball 110 about the y-axis (that is, the roll of the conductive trackball 110). The user interface device 100 also could include a motion sensor 212 to sense movement of the conductive trackball 110 about the z-axis (that is, the yaw of the conductive trackball 110). Other types of motion sensors may be used to detect the movement of the conductive trackball 110. For example, in an alternative embodiment, the motion sensors 212 can employ a laser sensor that detects motion of the conductive trackball 110 in the corresponding direction or orientation based on a change in reflection or refraction of laser light reflected off of a surface of the conductive trackball 110.

In the depicted embodiment, the conductive trackball 110 has a non-conductive core 216 enveloped by a conductive surface layer 218. The non-conductive core 216 can be any of a variety of materials, such as plastic, ceramic, wood, stone, or combinations thereof. The conductive surface layer 218 can have one or more layers of conductive material, including, for example, aluminum (Al), copper (Cu), gold (Au), silver (Ag), a transparent conducting oxide (TCO) such as aluminum zinc oxide (AZO) or indium tin oxide (ITO), or combinations thereof. The conductive surface layer 218 may be a continuous, uninterrupted surface. Alternatively, the conductive surface layer 218 may implement a pattern of conductive material interspersed with non-conducting gaps, such as small squares or dots, to provide improved capacitive sensitivity. Alternatively, the conductive trackball 110 may be implemented as a hollow metal ball, a solid metal ball, a ball with of multiple layers of conductive material, and the like.

As noted above, the conductive trackball 110 and the one or more conductive plates 210 are separated by an air gap or other dielectric so as to enable the generation of an electric field between the two and thus operate as capacitive touch sensor. In certain implementations, the conductive trackball 110 is coupled to a voltage potential or to an input of the capacitive sense circuit that monitors the capacitance of the trackball 110/plate 210 combination. In such instances, the user interface device 100 employs a conductive contact 220 in the cavity 202 to provide electrical contact with the conductive trackball 110 without substantially interfering with the rotation of the conductive trackball 110. The conductive contact 220 can include, for example, a conductive roller, a conductive ball bearing, a conductive brush, a spring-loaded conductive pin or level arm, and the like. In other embodiments, the conductive trackball 110 is permitted to float relative to a ground potential or other voltage potential and the conductive plate 210 is coupled to the input of the capacitive sense circuit, in which case the conductive contact 220 may be omitted.

In some implementations, the conductive trackball 110 also may act as a virtual push button, whereby the user presses on the conductive trackball 110 to engage a push button (not shown), which signals a "press" or "click" input to the control system of the user interface device 100. The push button may be implemented in conjunction with either the roller 214 or the conductive contact 220 such that when a downward force is placed on the conductive trackball 110, the roller 212 or the conductive contact 220 is forced down, which engages the corresponding push button. Alternatively, this push button may be implemented as a mechanism separate from the roller 214 or conductive contact 220.

In the depicted example implementation of FIG. 3, the capacitive trackball 110 is positioned in a cavity 302 of the housing 102 that encloses an equatorial portion of the capacitive trackball 110. The cavity 302 includes an opening 304 at the top surface 104 of the housing 102 and an opposing opening 306 at the bottom surface 106 of the housing 102. A top hemispherical portion of the conductive trackball 110 extends through the opening 304 or otherwise permits manipulation of the conductive trackball 110 at the top surface 104. Similarly, a bottom spherical portion of the conductive trackball extends through the opening 306 or otherwise permits manipulation of the conductive trackball 110 at the bottom surface 106. Thus, the conductive trackball 110 may be contacted and manipulated by, for example, user fingers 307, 308, and 309 via the top surface 104 and the bottom surface 106 concurrently. As with the implementation of FIG. 2, the cavity 302 extends beyond the equator of the capacitive trackball 110 and the openings 304 and 306 of the cavity 308 are smaller than the diameter of the conductive trackball 110 so that the trackball 110 is maintained in the cavity 308 in any gravitational orientation of the user interface device 100.

Also disposed in the cavity 302 are the one or more motion sensors 212, the conductive contact 220 (analogous to the conductive contact 220 described above), and one or more conductive plates 310 (analogous to the conductive plates 210 described above). In the example of FIG. 3, the conductive plates 310 are offset from the equator of the conductive trackball 110. However, in other embodiments the conductive plates 310 may be substantially centered or aligned to the equator of the conductive trackball 110.

As noted above, the conductive trackball 110 and the one or more conductive plates 210/310 in proximity to the surface of the conductive trackball 110 together function as a capacitor having a capacitance $C_T$. The human body is capable of storing charge and thus introduces a relatively small capacitance when placed in contact with a conductor. Accordingly, a user's manipulation of the conductive trackball 110 changes the effective capacitance observed by the capacitive sense circuit (this effective capacitance is denoted herein as $C_{sensor}$). In various configurations, the effective capacitance $C_{sensor}$ is relative to the number user contact points on the conductive trackball 110. That is, the effective capacitance $C_{sensor}$ reflects the number of fingers a user has placed in contact with the conductive trackball 110. As described in greater detail herein, the user interface device 100 utilizes this relationship between the effective capacitance $C_{sensor}$ and the number of fingers in contact with the conductive trackball 110 to implement a multitouch-enabled capacitive sensor via the conductive trackball assembly 108.

Figure 4:
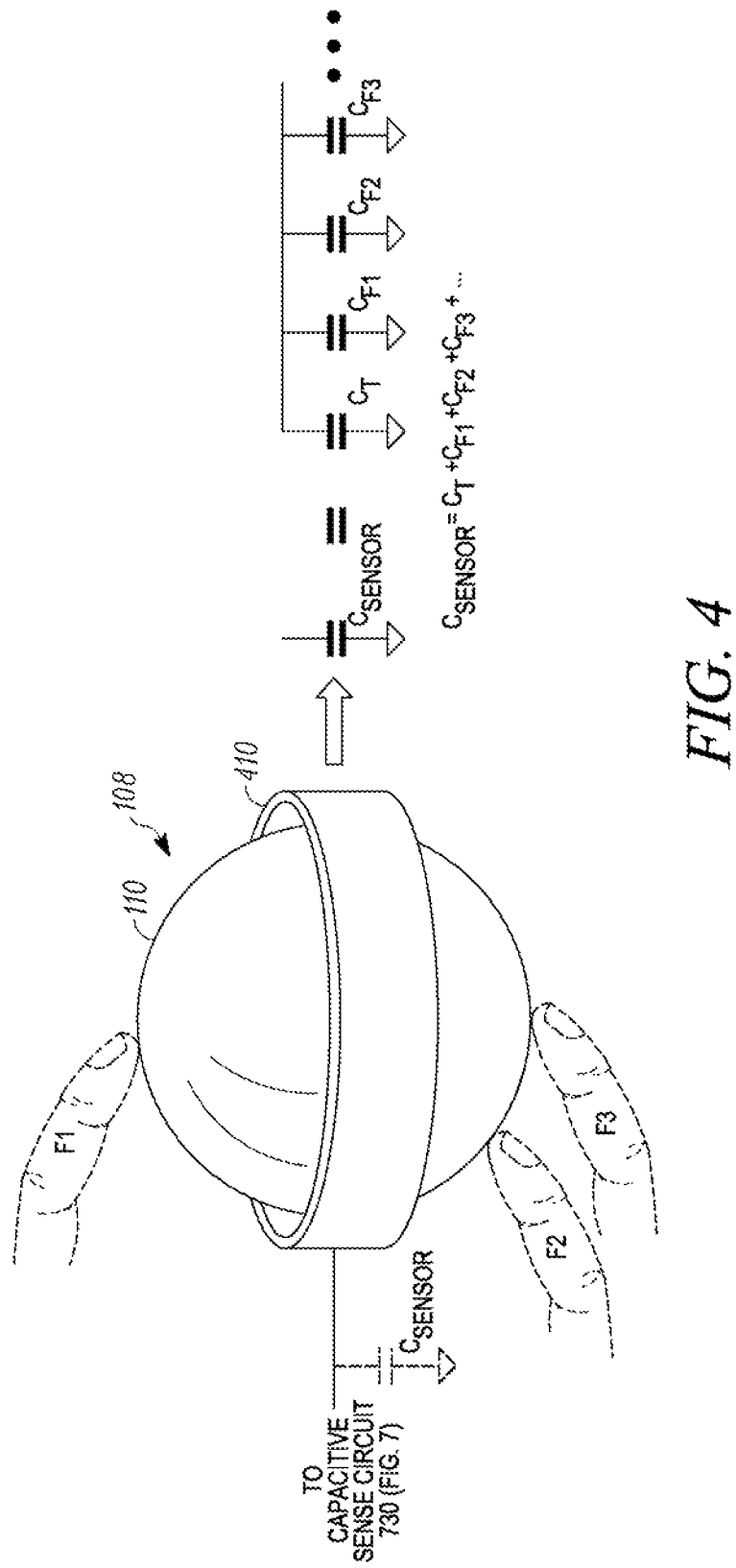
FIG. 4 is a diagram illustrating an example implementation of the capacitive trackball assembly of the user interface device of FIG. 1 in accordance with at least one embodiment of the present disclosure.

FIG. 4 illustrates an example configuration of the capacitive trackball assembly 108 in accordance with at least one embodiment of the present disclosure. In the depicted configuration, the capacitive trackball assembly 108 includes a continuous conductive plate 410 that completely encircles the conductive trackball 110 at the equator of the conductive trackball 110. Further, the conductive plate 410 is electrically connected to an input of the capacitive sense circuit 730 (described below with reference to FIG. 7) and the electric potential of the conductive trackball 110 is permitted to float relative to a ground potential. In this configuration, the effective capacitance $C_{sensor}$ sensed by the capacitive sense circuit when the conductive trackball 110 is not in contact with the user would be approximately equal to the capacitance $C_T$ of the trackball/plate (that is, $C_{sensor}$ $C_T$). When one or more fingers are placed in contact with the trackball 110, the effective capacitance $C_{sensor}$ sensed by the capacitive sense circuit then becomes approximately equal to a sum of the capacitance $C_T$ and the capacitance $C_{Fn}$ introduced by each finger in contact with the conductive trackball 110 (that is, $C_{sensor} \approx C_T + C_{F1} + \ldots + C_{Fn}$ for n fingers in contact). A number of human body models of the capacitance introduced by a human have been promulgated. One such human body model represents a user's finger as a 10 kilo ohm (kΩ) resistor and a 150 picofarad (pF) capacitor in series between the point of contact of the finger and a ground potential. Thus, assuming the capacitance $C_T$ of the capacitive trackball assembly 108 is, for example, approximately 30 pF, under this model one finger in contact with the conductive trackball 110 would result in an effective capacitance $C_{sensor}$ of 180 pF (30 pF+150 pF), whereas three fingers in contact with the conductive trackball 110 would result in an effective capacitance $C_{sensor}$ of 550 pF (30 pF+3×150 pF).

Figure 5:
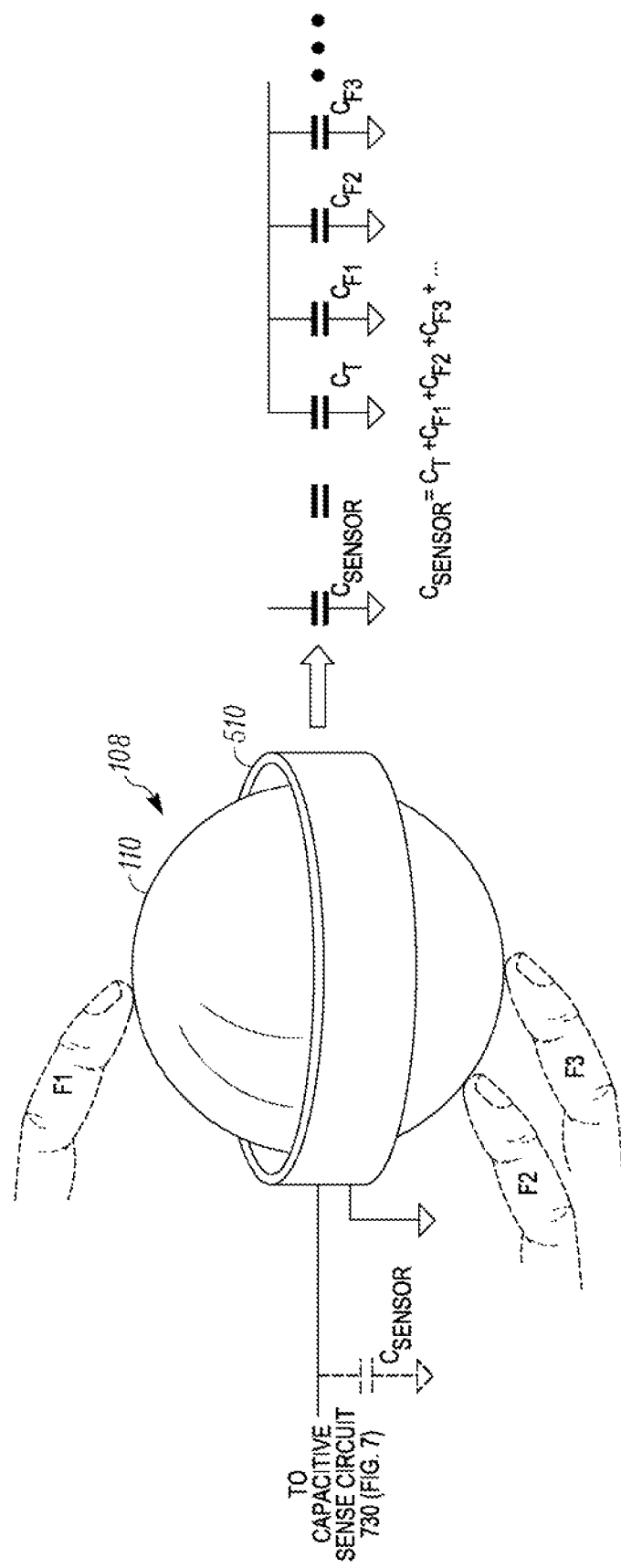
FIG. 5 is a diagram illustrating another example implementation of the capacitive trackball assembly of the user interface device of FIG. 1 in accordance with at least one embodiment of the present disclosure.

FIG. 5 illustrates another example configuration of the capacitive trackball assembly 108 in accordance with at least one embodiment of the present disclosure. As with the configuration of FIG. 4, the capacitive trackball assembly 108 includes a continuous conductive plate 510 that completely encircles the equator of the conductive trackball 110. However, in the configuration of FIG. 5 it is the conductive trackball 110 that is electrically connected to an input of the capacitive sense circuit 730 (via the conductive contact 220) and the conductive plate 510 is connected to a ground potential. In this configuration, the effective capacitance $C_{sensor}$ sensed by the capacitive sense circuit then becomes approximately equal to a sum of the capacitance $C_T$ and the capacitance $C_{Fn}$ introduced by each finger in contact with the conductive trackball 110 (that is, $C_{sensor} \approx C_T + C_{F1} + \ldots + C_{Fn}$ for n fingers).

Figure 6:
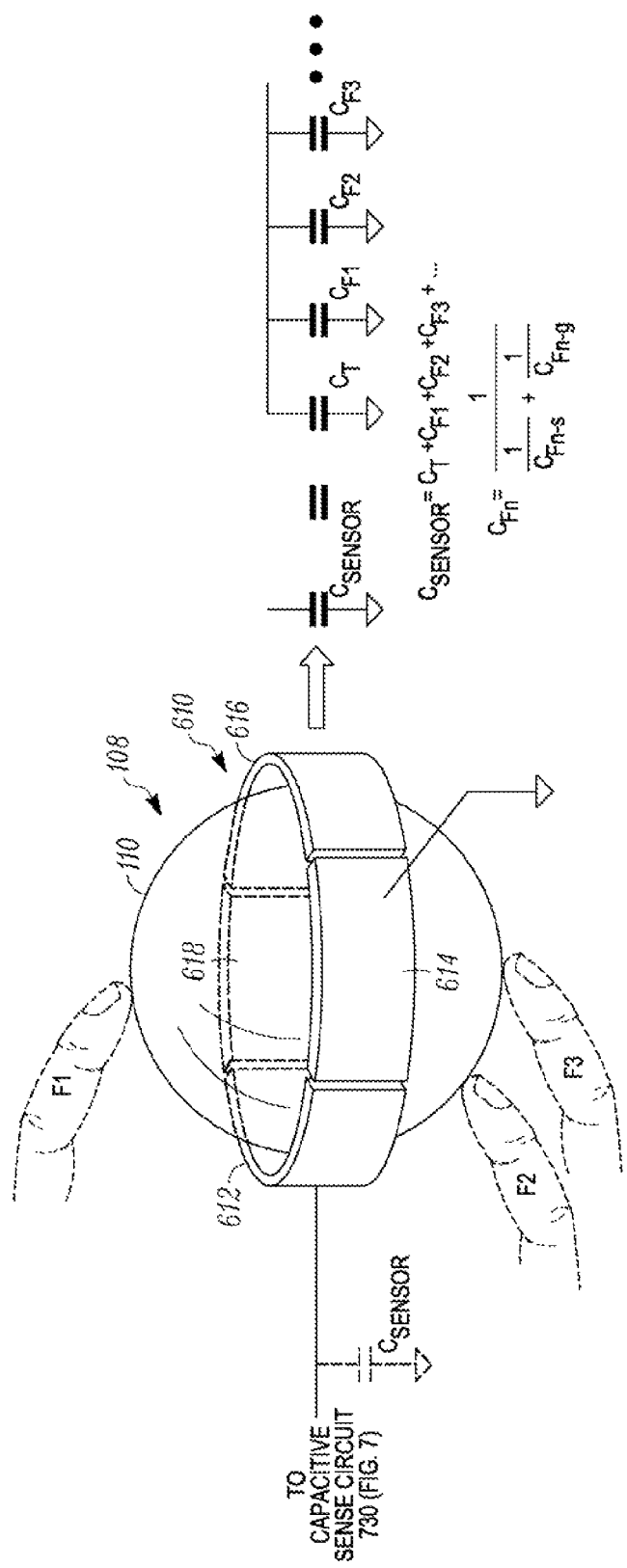
FIG. 6 is a diagram illustrating yet another implementation of the capacitive trackball assembly of the user interface device of FIG. 1 in accordance with at least one embodiment of the present disclosure.

FIG. 6 illustrates yet another example configuration of the capacitive trackball assembly 108 in accordance with at least one embodiment of the present disclosure. In the depicted configuration, the capacitive trackball assembly 108 includes a segmented ring 610 encircling the conductive trackball 110. The segmented ring 610 includes a plurality of physically separate conductive plates 612, 614, 616, and 618, whereby the conductive plates 612 and 616 are electrically connected to an input of the capacitive sense circuit 730 and the conductive plates 614 and 618 are electrically connected to a ground potential. As with the configurations of FIGS. 4 and 5, the configuration of FIG. 6 provides an effective capacitance $C_{sensor}$ of $C_T$ when the user is not in contact with the conductive trackball 110. Each finger in contact with the conductive trackball introduces two capacitances: a capacitance between the sensor-connected ring segments 612/616 and the ground potential (referred to as the capacitance $C_{Fn-s}$); and a capacitance between the ground-connected ring segments 614/618 and the ground potential (referred to as the capacitance $C_{Fn-g}$). Accordingly, the effective capacitance $C_{sensor}$ sensed by the capacitive sense circuit becomes approximately equal to a sum of the capacitance $C_T$ and the capacitance $C_{Fn}$ introduced by each finger n in contact with the conductive trackball 110; that is, $C_{sensor} \approx C_T + C_{F1} + \ldots + C_{Fn}$ for n fingers, where $C_{Fn} \approx 1/((1/C_{Fn-s}) + 1/C_{Fn-g}))$.

Although various example configurations for the capacitive trackball assembly 108 are described above with reference to FIGS. 4-6, other configurations may be implemented without departing from the scope of the present disclosure. For example, rather than implement a single plate, the capacitive trackball assembly 108 can implement multiple substantially parallel plates that partially or fully circumscribe the conductive trackball 110 at different latitudes. In this example, all of the rings may be coupled to the input of the capacitive sense circuit or all may be coupled to a ground potential as similarly described above with reference to the configurations of FIGS. 4 and 5. Alternatively, some of the plates may be coupled to the input of the capacitive sense circuit 730 while others plates are coupled to the ground potential as similarly described above with reference to the configuration of FIG. 6. As another example, the conductive plate may spiral around the conductive trackball 110 as noted above.

Figure 7:
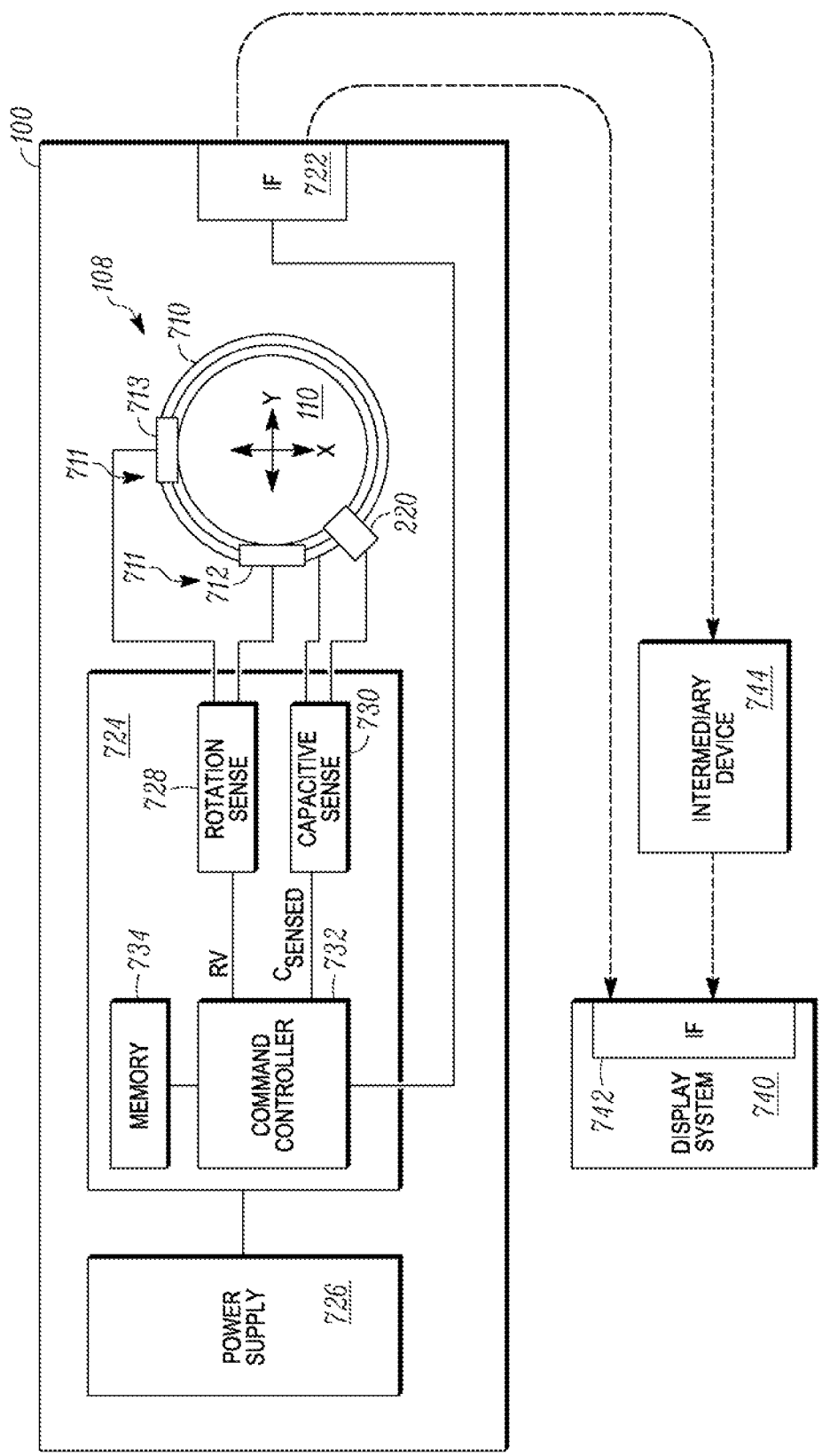
FIG. 7 is a block diagram illustrating a control system of the user interface device of FIG. 1 in accordance with at least one embodiment of the present disclosure.

FIG. 7 illustrates a block diagram of a control system of the user interface device 100 in accordance with at least one embodiment of the present disclosure. The control system includes the capacitive trackball assembly 108 with the conductive trackball 110 and one or more conductive plates 710 (analogous to the conductive plates 210, 310, 410, 510, or 610). The user interface device 100 further includes a rotation sensor 711 to detect a rotation vector of the conductive trackball 110. The rotation sensor 711 can include, for example, roller-based motion sensors 712 and 713 for sensing rotation of the conductive trackball 110 about the x-axis and y-axis, respectively. A rotation sense circuit 728 generates a rotation vector based on the signaling provided by the motion sensors 712 and 713 of the rotation sensor 711. A conductive contact 220, such as a wire brush or a spring-loaded ball bearing, pin, or wheel, may be used to provide an electrical connection with the conductive trackball 110.

The control system of the user interface device 100 also includes an interface 722 and an electronic control unit (ECU) 724. In implementations whereby the user interface device 100 is a portable device (that is, is not externally powered), the ECU 724, the interface 722, and other electrical components of the user interface device 100 may receive power via a power supply 726, such as a pack of one or more batteries or a capacitive charge-storage device. The ECU 724 is coupled to the capacitive trackball assembly 108, the rotation sensor 711, and the interface 722 and is configured to determine an intended user command based on a number of user contact points with the conductive trackball 110 and a concurrent rotation vector of the conductive trackball 110, and then control the interface 722 to transmit a representation of this intended user command to the system being controlled. In the depicted example, the ECU 724 includes the rotation sense circuit 728, the capacitive sense circuit 730, a command controller 732, and a memory 734.

The rotation sense circuit 728 is coupled to the rotation sensor 711 and is configured to detect a rotation vector (denoted herein as "RV") of the conductive trackball 110 based on signaling received from individual motion sensors 712 and 713. In one embodiment, the motion sensor 712 tracks the rotation of the conductive trackball 110 around the x-axis and the motion sensor 713 tracks the rotation of the conductive trackball 110 around the y-axis, and thus the rotation vector RV detected by the motion detector circuit 728 has an x-axis component and a y-axis component. Further, in one embodiment, the rotation sensor 711 may implement a third motion sensor (not shown) to track the rotation of the conductive trackball 110 around the z-axis, and the rotation vector RV detected by the motion detector circuit 728 thus may further include a z-axis component.

The capacitive sense circuit 730 is coupled to the capacitive trackball assembly 108 and is configured to detect the effective capacitance $C_{sensor}$ or, alternatively, a change in the effective capacitance $C_{sensor}$ (denoted herein as $\Delta C_{sensor}$) of the capacitive trackball assembly 108. The detected capacitance metric (referred to herein as "$C_{sensed}$") represents the number of fingers the user has placed in contact with the conductive trackball 110. As described above, the capacitive sense circuit 730 may have an input electrically connected to the conductive plate 710 and thus detect the capacitance $C_{sensor}$ relative to the conductive plate 710. Alternatively, the capacitive sense circuit 730 may have an input electrically connected to the conductive trackball 110 (via the conductive contact 220, as described above) and thus detect the change in capacitance $C_{sensor}$ relative to the conductive trackball 110. For ease of illustration, an implementation whereby the effective capacitance $C_{sensor}$ is measured and used is described herein. However, the same principles may be used with reference to the change in effective capacitance $C_{sensor}$ using the teachings provided herein and thus reference to use of the effective capacitance $C_{sensor}$ also applies equally to the use of the change in effective capacitance $\Delta C_{sensor}$ unless otherwise noted. Example implementations of the capacitive sense circuit 730 are described in greater detail below with reference to FIGS. 10 and 11.

The command controller 732 includes inputs to receive signaling representative of the rotation vector RV detected by the motion detector circuit 728 and signaling $C_{sensed}$ representative of the capacitance $C_{sensor}$ detected by the capacitive sense circuit 730, and from these inputs, infer a command from the user's manipulation of the conductive trackball 110. The command controller 732 then may provide a representation of the inferred user command to the interface 722 for transmission to the controlled system. In one embodiment, the command controller 732 may implement hardwired logic to implement this operation. To illustrate, the command controller 732 may include an application specific integrated circuit (ASIC), hardwired logic, or a programmable logic device (PLD), such as a programmable logic array (PLA) or field programmable gate array (FPGA). Alternatively, the command controller 732 may include a microprocessor or microcontroller that executes instructions to implement the operations described herein. The instructions may be stored as software or firmware in the memory 734, which can include, for example, a flash memory or other non-volatile memory. In another embodiment, the command controller 732 implements both hardwired logic and the execution of code to implement the operations described herein.

In addition to storing instruction code, the memory 734 may store other configuration information for use by the command controller 732. In one implementation, the command controller 732 makes use of a table or other data structure that provides the mappings between combinations of particular rotation vectors and effective capacitance $\Delta C_{sensor}$ values and corresponding user commands. A representation of this data structure may be stored in the memory 734. Accordingly, mappings may be added, removed, or modified by programming the memory during, for example, a firmware update of the user interface device 100, or the mappings may be user-programmed or otherwise user-configured.

The interface 722 is used to transmit the user command to a system being controlled by the user interface device 100. In some instances, the user interface device 100 may be connected to the controlled system via a bus or other wired connection. In such instances, the interface 722 can include a wired interface, such as a proprietary wired interface or a wired interface compliant with one or more standards, such as a Universal Serial Bus (USB) or Institute of Electrical and Electronics Engineers (IEEE) 1394 standard. In other instances, the user interface device 100 is wirelessly connected to the controlled system, and thus the interface 722 can include a wireless interface, such as an infrared-(IR) based transmitter or a radio frequency (RF)-based transmitter. The wireless interface may implement a proprietary interface, or may comply one or more wireless standards, such as a Bluetooth standard, a ZigBee RF4CE standard, an IEEE 802.11 standard, an IEEE 802.15 standard, and the like.

The user interface device 100 can directly transmit a representation of a user command to the controlled system. To illustrate, the user interface device 100 may be paired directly with a display system 740 that has an interface 742 compatible with the interface 722 of the user interface device 100. For example, if the interface 722 is an IR transmitter, an IR receiver would be a compatible interface for the display system 740. In this configuration, the user interface device 100 transmits the representation of the user command for reception by the display system 740. In some instances, the controlled system may be out of transmission range of the interface 722 or the controlled system may not have an interface compatible with the interface 722. To enable reception of the user command, the user interface device 100 may communicate with the controlled system via an intermediary device 744. This implementation also shows the representation of the user command being transmitted from the interface 722 of the user interface device 100 to the intermediary device 744, which then forwards the representation of the user command to the controlled system. The intermediary device 744 can include, for example, a tablet computer, a notebook computer, a computing-enabled cellular phone, a set-top box, and the like. As an example, the interface 722 could be an IEEE 802.11-compliant interface (often referred to as a "wifi" interface) and the intermediary device 744 could include an IR transmitter to communicate with an IR receiver of the display system 740 and also include a wifi interface to communicate with the user interface device 100. Accordingly, to transmit a user command to the display system 740, the user interface device 100 wirelessly transmits a representation of the user command to the intermediary device 744 via the IEEE 802.11-compliant interfaces and the intermediary device 744 then transmits the representation of the user command to the display system 740 via the IR-compliant interfaces.

Figure 8:
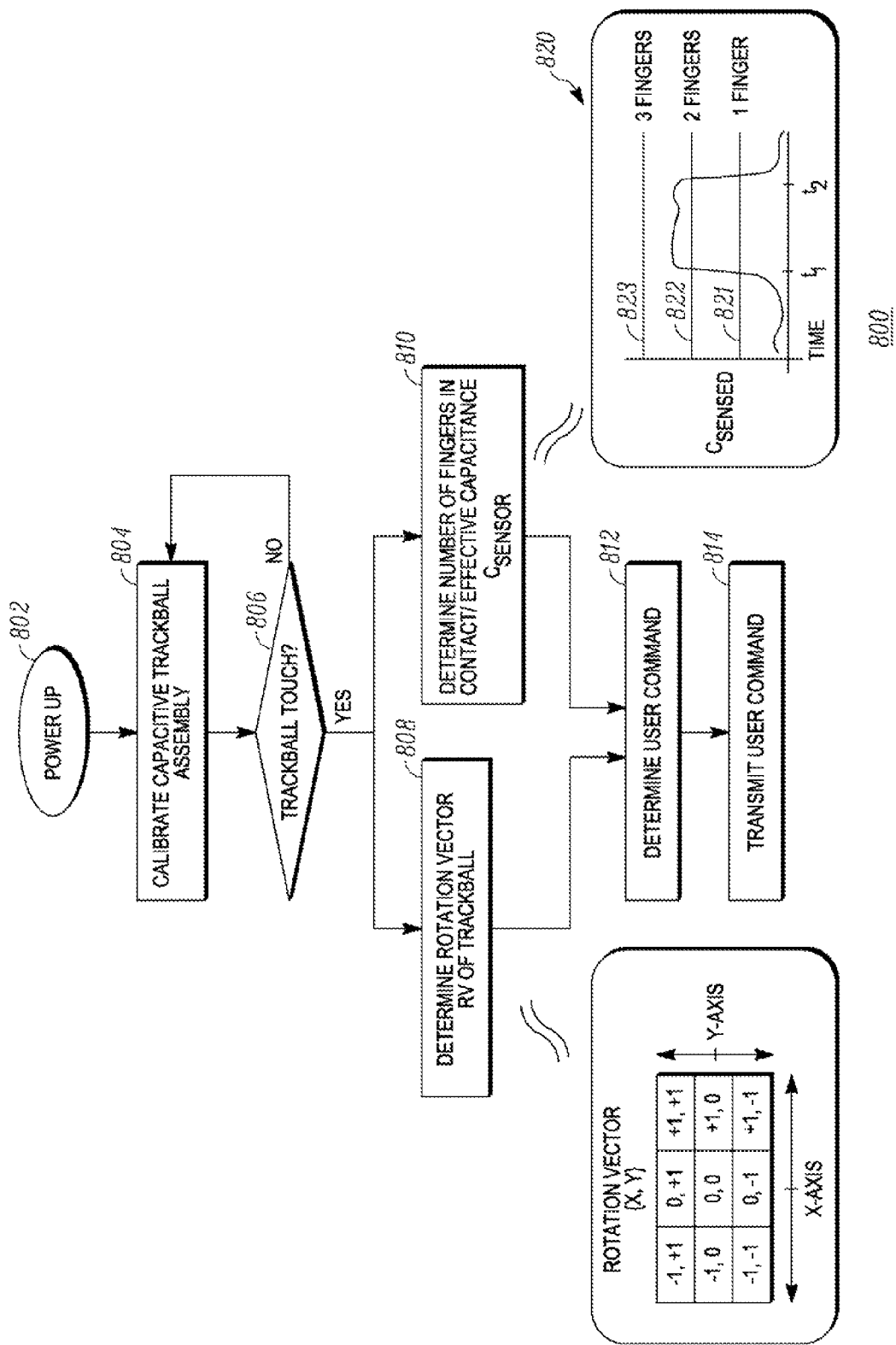
FIG. 8 is a flow diagram illustrating a method of determining and transmitting a user command from the user interface device of FIG. 1 in accordance with at least one embodiment of the present disclosure.

FIG. 8 illustrates a method 800 of operation of the user interface device 100 in accordance with at least one embodiment of the present disclosure. The method 800 is described with reference to the control system of the user interface device 100 outlined above with reference to FIG. 7. The method 800 initiates at block 802 when the user interface device 100 is powered up and performs an initialization routine. After initialization is complete, at block 804 the command controller 732 and the capacitive sense circuit 730 can perform a calibration process to accommodate for noise introduced into the sensed effective capacitance $C_{sensed}$ (that is, the detected or sensed representation of effective capacitance $C_{sensor}$) of the capacitive trackball assembly 108. This noise typically is a result of power supply noise, RF transmitters, and environmental conditions such as humidity and temperature changes. In one embodiment, the calibration process includes determining a noise floor for the sensed effective capacitance $C_{sensed}$ while a user is not in contact with the conductive trackball 110 (that is, when $C_{sensed} \approx C_T$). After setting this noise floor, any detected effective capacitance that is at or below this noise floor may be automatically rejected as a spurious event. The calibration process further can include determining the "uncontacted" capacitance $C_T$ of the capacitive trackball assembly 108 and scaling the one or more capacitive threshold levels used to discern the number of user contact points accordingly. For example, in the event that the capacitance $C_T$ is determined to be 10% greater than an expected or nominal value, the capacitive threshold level may be increased by a commensurate amount. In at least one embodiment, the calibration process may be performed on a continuous or periodic basis to account for changes in the noise environment.

During operation, the capacitive sense circuit 730 periodically or continuously monitors the effective capacitance $C_{sensor}$ for the capacitive trackball assembly 108 and provides a representation $C_{sensed}$ of the effective capacitance $C_{sensor}$ to the command controller 732 at block 806. In the event that the effective capacitance $C_{sensor}$ exceeds the current noise floor, the command controller 732 registers a user contact to the conductive trackball 110 and thus initiates the process of inferring the user's intended command.

In at least one embodiment, the user's intended command is reflected by at least two indicia: (1) the direction of rotation of the conductive trackball 110; and (2) the number of fingers in contact with the conductive trackball 110. Accordingly, at block 808 the command controller 732 determines the rotation vector RV of the conductive trackball 110 using the signaling from the rotation sensor 711. In one embodiment, the rotation vector RV is represented as rotational movement around the x-axis and the y-axis measured in response to the touch detected at block 806. This rotational movement can be measured as an instantaneous or single-point measurement or as a net or average rotational movement over a given sample period (e.g., over a 10 millisecond period). Either way, the rotation vector RV can be represented as a value pair {X,Y}, where X represents the rotational movement around the x-axis and can have a value of, for example, −1 (backward rotation), 0 (no rotation), or +1 (forward rotation), and Y represents the rotational movement around the y-axis and can have a value of, for example, −1 (rotation to the left), 0 (no rotation), or +1 (rotation to the right).

At block 810 the command controller 732 determines the number of fingers in contact with the conductive trackball 110 based on the effective capacitance $C_{sensor}$ of the capacitive trackball assembly 108 resulting from the user's contact with the conductive trackball 110. As noted above, the effective capacitance $C_{sensor}$ increases with each additional user contact point (e.g., finger) in contact with the conductive trackball 110. Accordingly, in one embodiment the command controller 732 determines the number of fingers in contact based on a relationship between the effective capacitance $C_{sensor}$ signaled by the capacitive sense circuit 730 and one or more determined capacitive threshold levels, whereby each capacitive threshold level represents a corresponding number of fingers. Any number of capacitive threshold levels may be implemented. A single capacitive threshold level may be implemented to simply differentiate between "contact" and "no contact" with the conductive trackball 110. As another example, four thresholds may be implemented to differentiate between one, two, three, or four fingers in contact with the conductive trackball 110.

Chart 820 depicts an example measurement of the sensed effective capacitance $C_{sensed}$ over time, whereby a user contacts the conductive trackball 110 at time $t_1$ and ceases contact at time $t_2$. This example includes three capacitive threshold levels: a one-finger threshold 821, a two-finger threshold 822, and a three-finger threshold 823. In this example, the one-finger threshold 821 also serves as the noise floor, although in other implementations the noise floor may be implemented as a separate, lower threshold. Any sensed effective capacitance $C_{sensed}$ falling between the one-finger threshold 821 and the two-finger threshold 823 is registered by the command controller 732 as a one-finger touch. Any sensed effective capacitance $C_{sensed}$ falling between the two-finger threshold 822 and the three-finger threshold 823 is registered by the command controller 732 as a two-finger touch. Any sensed effective capacitance $C_{sensed}$ falling above the three-finger threshold 823 is registered by the command controller 732 as a three-finger touch. In the example of chart 820, the sensed effective capacitance $C_{sensed}$ as a result of the touch at time $t_1$ falls between the two-finger threshold 822 and the three-finger threshold 823 and thus would be registered as a two-finger touch.

The capacitive threshold levels may be fixed at the time of manufacture of the user interface device 100 by, for example, blowing fuses or antifuses, writing a value to one-time-programmable (OTP) register, or tying an input pin to a particular voltage. Alternatively, the number or levels of the capacitive threshold levels may be modified after manufacture. For example, values representing the capacitive threshold levels may be stored in the memory 734 (FIG. 7) and thus may be modified during a firmware update, dynamically adjusted during the calibration process of block 804, adjusted by a user, and the like. Moreover, the capacitive threshold levels may be set depending on the user or a characteristic of the user. In this scenario, higher capacitive threshold levels may be implemented for a user identified as an adult compared to the capacitive threshold levels implemented for a user identified as a child. The user type or characteristic may be identified via a user identifier supplied to the user interface device 100, via an on-board sensor (e.g., a contact sensor that gauges a size of the user's hand), via an external sensor (e.g., a video camera used for gesture controls and which detects a size of the user), key presses, and the like.

At block 812, the command controller 732 uses the rotation vector RV determined at block 808 and the sensed number of fingers in contact (or sensed effective capacitance $C_{sensed}$) detected at block 810 to infer a user command intended by the user's manipulation of the conductive trackball 110. In at least one embodiment, the command controller 732 utilizes a look-up table or other data structure to identify the user command corresponding to a particular number-of-fingers/rotation vector combination. Table 1 below illustrates an example of this mapping for two different contexts: an electronic programming guide (EPG) used to navigate through television programming; and a widget-based graphical user interface (GUI). For Table 1, it is assumed that the thumb is the finger primarily placed in contact with the conductive trackball 110. The "press" referenced in the rotation vector column of table 1 can refer to no rotation of the conductive trackball 110 while being touched, to no rotation of the conductive trackball 110 while engaging a separate button (e.g., push button 112, FIG. 1) or to the user placing force on the trackball to so as to engage or click a push-button via the conductive trackball 110.

TABLE 1

| Number of Fingers | Rotation Vector | EPG Context | Widget GUI Context |
|---|---|---|---|
| Thumb Only (1) | Forward | Navigate Up | Move Cursor Up |
| | Back | Navigate Down | Move Cursor Down |
| | Left | Navigate Left | Move Cursor Left |
| | Right | Navigate Right | Move Cursor Right |
| | Press | Select Item | Select |
| Thumb + 1 Finger (2) | Forward | Channel Up | Zoom In |
| | Back | Channel Down | Zoom Out |
| | Left | Volume Up | Volume Up |
| | Right | Volume Down | Volume Down |
| | Press | Menu | Menu |
| Thumb + 2 Fingers (3) | Forward | Info | Rotate In-Focus Widget Up |
| | Back | Guide | Rotate In-Focus Widget Down |
| | Left | Page Up | Rotate In-Focus Widget Left |
| | Right | Page Down | Rotate In-Focus Widget Right |
| | Press | Last | Back/Return |

As illustrated by Table 1, the number of detected fingers in contact (that is, the relationship between the sensed effective capacitance C and the plurality of capacitive threshold levels) determines which subset of user commands may be intended. The particular rotation vector RV then determines which user command of the subset is selected.

After the user command has been identified, at block 814 the command controller 732 provides a representation of the user command to the interface 722 for transmission to the controlled system. The transmission of the representation of the user command can be a wireless or wired transmission. Further, as noted above, the interface 722 may transmit the representation of the user command directly to the controlled system or indirectly via an intermediary system 744.

Figure 9:
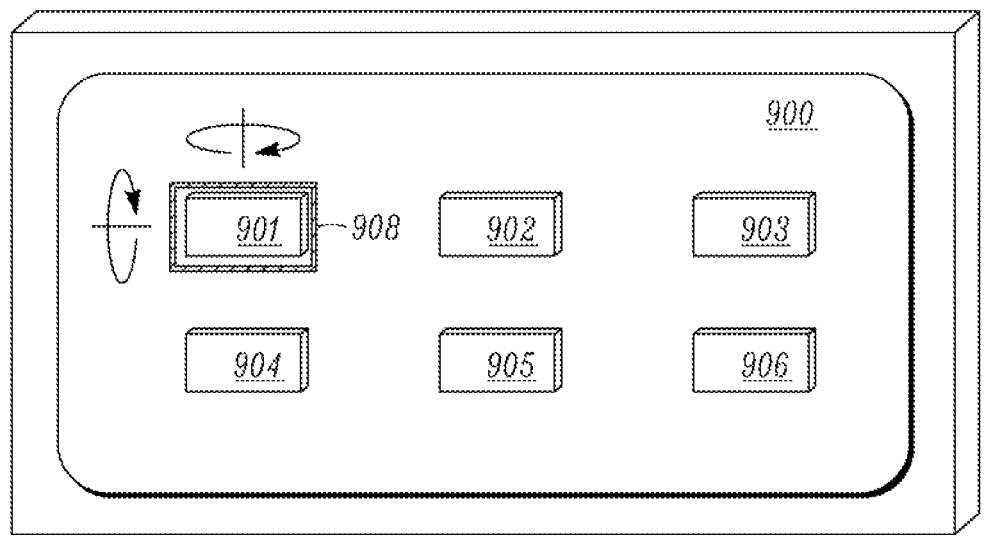
FIG. 9 is a diagram illustrating manipulation of a displayed graphical user interface (GUI) via the user interface device of FIG. 1 in accordance with at least one embodiment of the present disclosure.
Figure 9:
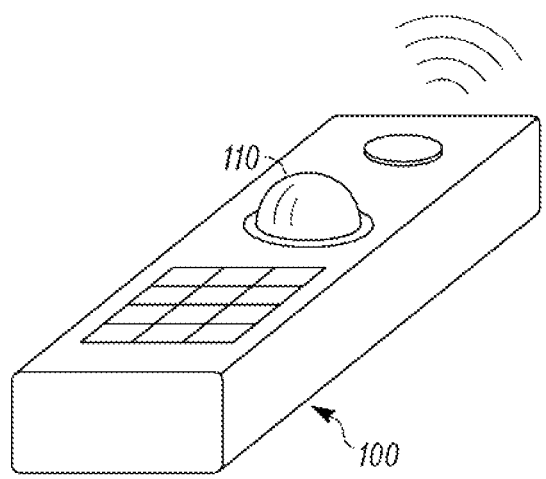

FIG. 9 illustrates an example user interaction with a widget GUI 900 using the user interface device 100 in accordance with the example user commands of Table 1 reproduced above. The widget GUI 900 displays a plurality of widgets 901, 902, 903, 904, 905, and 906. Each widget can display graphical information, textual information, or a combination thereof, for a corresponding software object or application. As provided by Table 1, a user may navigate between widgets by rotating the conductive trackball 110 using only one finger (e.g., the thumb). For a selected widget, identified by an in-focus highlight feature 908, the user can enlarge or shrink the size of the widget by rotating the conductive trackball 110 forward or backward, respectively, using two fingers (e.g., the thumb and another finger). Similarly, a user may rotate the selected widget up, down, left, or right by rotating the conductive trackball 110 forward, backward, left, or right, respectively, using three fingers (e.g., the thumb and two other fingers). Each direction of rotation can display a different graphic or different set of information. For example, the widgets 901-906 can include thumbnail images of movies available for streaming to the user, and rotating a widget up displays a synopsis of the movie, rotating the widget down displays reviews of the movie, rotating the widget right displays actors in the movie, and rotating the widget left displays the director of the movie.

Figure 10:
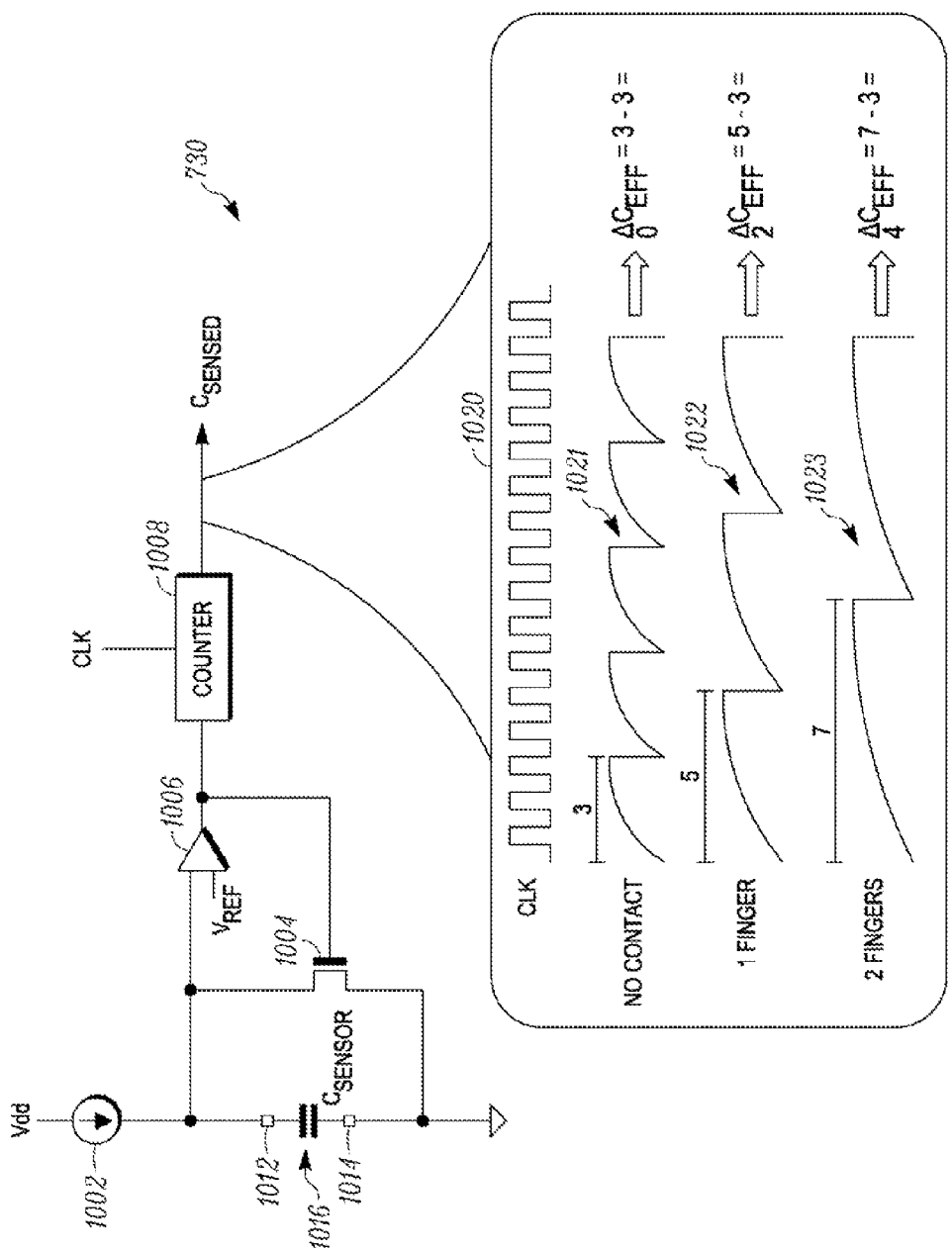
FIG. 10 is a diagram illustrating a resistor-capacitor (RC)-based implementation of a capacitive sense circuit of the user interface device of FIG. 1 in accordance with at least one embodiment of the present disclosure.

FIG. 10 illustrates an example implementation of the capacitive sense circuit 730 of FIG. 7 used to sense the effective capacitance $C_{sensor}$ of the capacitive trackball assembly 108. The depicted arrangement utilizes the effective capacitance $C_{sensor}$ in a resistor-capacitor (RC) arrangement whereby the charge-discharge cycle of the RC circuit is affected by the effective capacitance $C_{sensor}$ and is thus used to sense the effective capacitance $C_{sensor}$. In this implementation, the capacitive sense circuit 730 includes a current source 1002, a switch 1004, a comparator 1006, and a counter 1008. The current source 1002 is coupled to a node 1012. The switch 1004 is implemented as, for example, an n-type field effect transistor (FET) having a current terminal coupled to the node 1012, a current terminal coupled to a node 1014 or a ground potential, and a gate terminal. The comparator 1006 includes an input coupled to the node 1012, an input to receive a reference voltage $V_{REF}$ and an output coupled to the gate terminal of the switch 1004. The counter 1008 has an input coupled to the output of the comparator 1006, an input to receive a clock signal CLK, and an output to provide a count value representing a number of clock cycles counted between assertions of the output of the comparator 1006. As noted above, the capacitive trackball assembly 108 operates as a capacitor (illustrated as capacitor 1016 in FIG. 10) having an effective capacitance $C_{sensor}$ that changes depending on the number of fingers in contact with the conductive trackball 110 of the capacitive trackball assembly 108. In the illustrated circuit, the node 1012 is coupled to one "plate" of this capacitor 1016 and the node 1014 is coupled to the other "plate" or to a ground reference. Depending on the configuration, the capacitor "plate" coupled to the node 1012 can include one of the conductive plates (see, e.g., the configurations of FIGS. 4 and 6) or the conductive trackball 110 (see, e.g., the configuration of FIG. 5). The capacitor "plate" coupled to the node 1014 can include one of the conductive plates (see, e.g., the configurations of FIGS. 5 and 6).

In operation, the current source 1002 continuously charges the capacitor 1016 (that is, the capacitor formed by the capacitive trackball assembly 108). Each time the voltage across the capacitor 1016 reaches the reference voltage $V_{REF}$, the comparator 1006 pulses high, which in turn closes the switch 1004, which acts as a relatively small resistor to discharge the capacitor 1016. The high pulse of the comparator 1006 also resets the counter 1008. As the rate at which the capacitor 1016 charges up to the reference voltage $V_{REF}$ is inversely proportional to the effective capacitance $C_{sensor}$ of the capacitor 1016, the number of clock cycles counted by the counter 1008 since the last reset provides a relative representation of the effective capacitance $C_{sensor}$.

Chart 1020 of FIG. 10 illustrates an example of the relationship between counted clock cycles and the effective capacitance $C_{sensor}$. In chart 1020, line 1021 represents the charge-discharge cycle of the capacitor 1016 when the user is not in contact with the conductive trackball 110, line 1022 represents the charge-discharge cycle when the user has one finger in contact with the conductive trackball 110, and line 1023 represents the charge-discharge cycle when the user has two fingers in contact with the conductive trackball 110. In the depicted example, the relatively low capacitance of the conductive trackball assembly 108 when the user is not in contact results in a relatively fast charge time (e.g., 3 clock cycles), whereas the relatively higher capacitances of the conductive trackball assembly 108 when one finger and two fingers are in contact result in relatively slower charge times (e.g., 5 clock cycles and 7 clock cycles, respectively). The command controller 732 thus may use the counted clock cycles between resets as either a relative representation of the effective capacitance $C_{sensor}$ or may use the difference between the number of clock cycles counted when the user is not in contact and the number of clock cycles counted when the user is in contact as a relative representation of the change in effective capacitance $\Delta C_{sensor}$.

Figure 11:
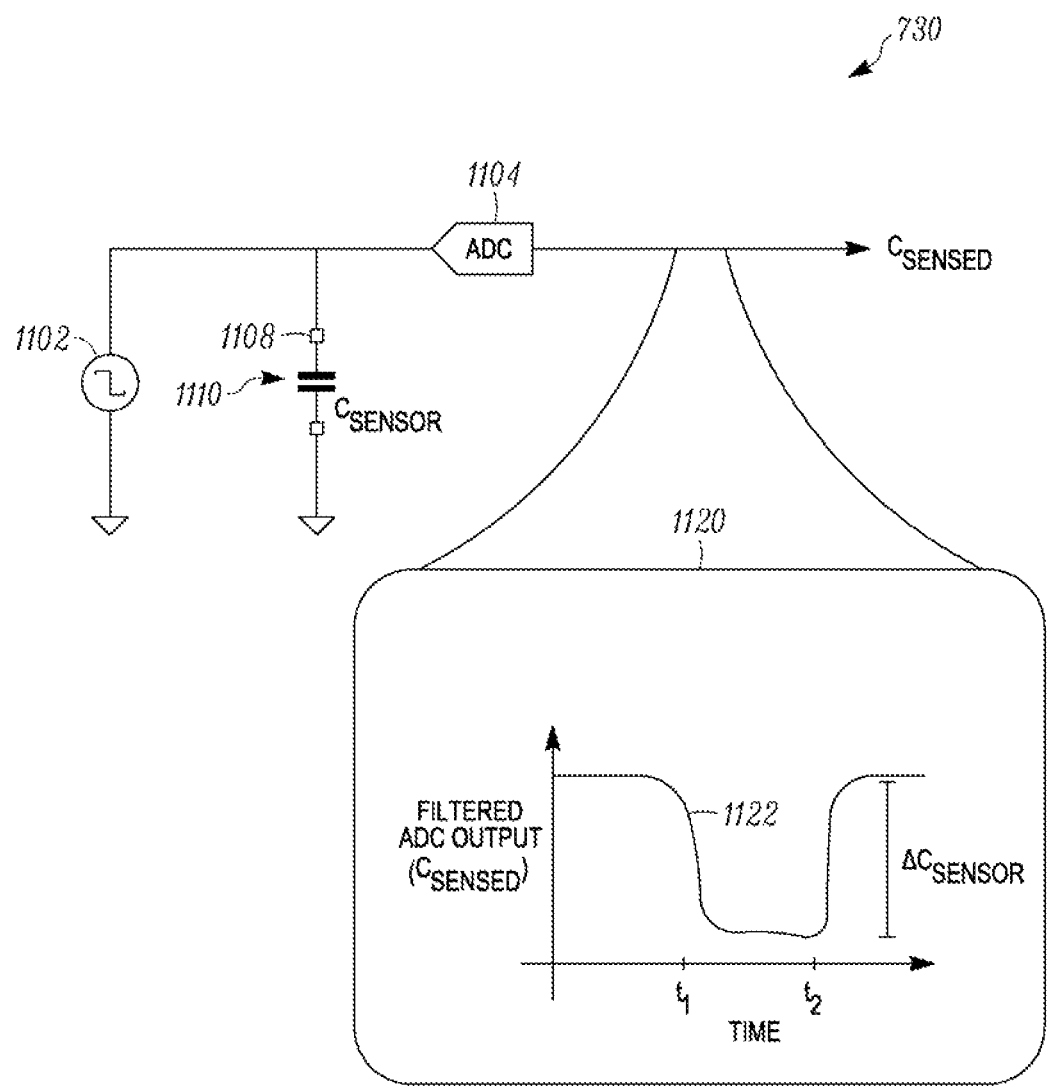
FIG. 11 is a diagram illustrating an analog-to-digital (ADC)-based implementation of a capacitive sense circuit of the user interface device of FIG. 1 in accordance with at least one embodiment of the present disclosure.

FIG. 11 illustrates another example implementation of the capacitive sense circuit 730 of FIG. 7 used to sense the effective capacitance $C_{sensor}$ of the capacitive trackball assembly 108. In the depicted example, the capacitive sense circuit 730 includes an excitation source 1102 (e.g., a square wave generator, saw-wave generator, or sine wave generator), and an analog-to-digital converter (ADC) 1104. The excitation source 1102 has an output coupled to a node 1108. The ADC 1104 has an input coupled to the node 1108 and an output to provide a digital value representative of the voltage at the input, whereby the output digital value is representative of the sensed effective capacitance $C_{sensed}$. In one embodiment, the positive or negative voltage references (not shown) used by the ADC 1104 may be adjusted based on the calibration process of block 804 of FIG. 8. The node 1108 is coupled to one of the "plates" of the capacitor provided by the capacitive trackball assembly 1108 (illustrated in FIG. 11 as capacitor 1110). This plate can include one or more conductive plates or the conductive trackball 110 depending on the particular implementation.

In operation, the excitation source 1102 provides a square wave signal or other oscillating signal to the capacitor 1110, thereby establishing an electric field at the capacitor 1110 (that is, at the capacitive trackball assembly 108). The voltage potential at the node 1108, and thus the digital value output by the ADC 1104, is inversely proportional to the effective capacitance $C_{sensor}$. Thus, when there is no user contact with the conductive trackball 110, the voltage at node 1108 is relatively high, as is the digital value output by the ADC 1104. However, as more fingers are placed in contact with the conductive trackball 110, the effective capacitance $C_{sensor}$ increases, thereby driving down the voltage at node 1108, and thus resulting in a lower digital value output by the ADC 1104. Chart 1120 illustrates an example of this operation. Line 1122 of chart 1120 represents the digital values output by the ADC 1104 based on the voltage at node 1108 as a function of time, whereby a user contact is initiated at time $t_1$ and ceases at time $t_2$. As illustrated by line 1122, the output digital values substantially decrease in response to the user contact (which reflects the additional charge introduced by the user's contact) and then increase after the user ceases contact. The command controller 732 thus may use the digital value output by the ADC 1104 as either a relative representation of the effective capacitance $C_{sensor}$ or may use the difference between the digital value output when the user is not in contact and the digital value output when the user is in contact as a relative representation of the change in effective capacitance $\Delta C_{sensor}$.

In accordance with one aspect of the present disclosure, a system includes a user interface device including a capacitive trackball assembly having a conductive trackball and a conductive plate proximate to a surface of the conductive trackball. The user interface device is to transmit a user command responsive to an effective capacitance of the capacitive trackball assembly resulting from a user contact with the conductive trackball. In one embodiment, the user interface device further includes a rotation sensor to detect a rotation vector of the conductive trackball concurrent with the user contact, wherein the user interface device is to transmit the user command further responsive to the rotation vector. The user interface device further may include a housing having a first opening at a first surface, wherein a first hemispherical portion of the conductive trackball is accessible via the first opening. The housing also may include a second opening at a second surface, wherein a second hemispherical portion of the conductive trackball is accessible via the second opening.

In one embodiment, the user interface device is to determine the user command based on a relationship between the effective capacitance of the capacitive trackball assembly and a plurality of threshold levels, each threshold level representing a corresponding number of user contact points with the capacitive trackball assembly. The plurality of threshold levels can include, for example, a first threshold level and a second threshold level greater than the first threshold level, and the user interface device can select the user command from a first set of one or more user commands responsive to the effective capacitance falling between the first threshold level and the second threshold level and the user interface device can select the user command from a second set of one or more user commands responsive to effective capacitance exceeding the second threshold level.

In one embodiment, the system further includes a display system to receive the user command, whereby the display system to modify an operation of the display system responsive to the user command. The system further can include an intermediary device wirelessly coupled to the user interface device and wirelessly coupled to the display device, wherein the user interface device is to wirelessly transmit the user command to the intermediary device and the intermediary device is to wirelessly transmit the user command to the display system.

In accordance with another aspect of the present disclosure, a user interface device includes a capacitive trackball assembly having a conductive trackball and a conductive plate proximate to a surface of the conductive trackball, and further includes a capacitive sense circuit coupled to the capacitive trackball assembly, the capacitive sense circuit to detect an effective capacitance of the capacitive trackball assembly. The user interface device further can include a command controller coupled to the capacitive sense circuit, the command controller to determine a user command based on a relationship between the effective capacitance and a plurality of threshold levels. The user interface device further can include a rotation sensor coupled to the command controller, the rotation sensor to detect a rotation vector of the conductive trackball, and wherein the command controller is to provide the user command further based on the rotation vector.

In one embodiment, the conductive plate is coupled to an input of the capacitive sense circuit. In another embodiment, the conductive plate is coupled to a ground potential and the conductive trackball is coupled to an input of the capacitive sense circuit. In one embodiment, the conductive plate substantially encircles the conductive trackball. Further, the capacitive trackball assembly can include a plurality of conductive plates including the conductive plate, wherein the plurality of conductive plates has a first conductive plate coupled to an input of the capacitive sense circuit, and a second conductive plate physically separate from the first conductive plate and coupled to a ground potential.

The user interface device can be a portable user device having a housing containing the capacitive trackball assembly and the capacitive sense circuit. The housing can include a first surface having a first opening, wherein a first hemispherical portion of a conductive trackball of the capacitive trackball is accessible via the first opening, and a second surface opposite the first surface. The housing further can include a second opening at the second surface, wherein a second hemispherical portion of the conductive trackball is accessible via the second opening.

In accordance with another aspect of the present disclosure, a method includes determining an effective capacitance of a capacitive trackball assembly of a user interface device resulting from a user contact with a conductive trackball, the capacitive trackball assembly having the conductive trackball and a conductive plate proximate to a surface of the conductive trackball. The method further includes determining a number of user contact points in contact with the conductive trackball based on the effective capacitance, and determining a user command for transmission from the user interface device based on the number of user contact points. Determining the number of user contact points can include determining the number of user contact points based on a relationship between the effective capacitance and a plurality of threshold levels, each threshold level associated with a different number of user contact points. The method also may include detecting a rotation vector of the conductive trackball concurrent with detecting the number of user contact points, wherein determining the user command for transmission includes determining the user command further based on the rotation vector. The method further may include transmitting the user command from the user interface device to a display system and modifying an operation of the display system based on the user command. In one embodiment, transmitting the user command includes wirelessly transmitting the user command from the user interface device to an intermediary device, and wirelessly transmitting the user command from the intermediary device to the display system.

Much of the inventive functionality and many of the inventive principles described above are well suited for implementation with or in software programs or instructions and integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts within the preferred embodiments.

It will be appreciated that the methods and the user interface device described herein may include one or more conventional processors and unique stored program instructions that control the one or more processors, to implement, in conjunction with certain non-processor circuits, some of the functions of the user interface device described herein. The non-processor circuits may include, but are not limited to, wireless transmitter and receiver circuits, signal drivers, clock circuits, power source circuits, sensor circuits, and the like.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A system comprising:
a user interface device comprising a capacitive trackball assembly having:
a conductive trackball; and
a continuous conductive plate proximate to a surface of the conductive trackball that forms an annular ring around the conductive trackball;
wherein the user interface device is to transmit a user command responsive to an effective capacitance of the capacitive trackball assembly resulting from a user contact with the conductive trackball, the user command selected from a plurality of user commands based on a relationship between the effective capacitance of the capacitive trackball assembly and a plurality of threshold levels, each threshold level representing a corresponding number of user contact points with the capacitive trackball assembly, and
wherein the user interface determines the number of user contacts points on the trackball, along with a concurrent sensed rotation vector of the trackball, to identify the user command intended by the user from the plurality of user commands.

2. The system of claim 1,
wherein the user interface device is to transmit the user command further responsive to the rotation vector.

3. The system of claim 1, wherein the user interface device comprises:
a housing having a first opening at a first surface, wherein a first hemispherical portion of the conductive trackball is accessible via the first opening.

4. The system of claim 3, wherein the housing comprises:
a second opening at a second surface, wherein a second hemispherical portion of the conductive trackball is accessible via the second opening.

5. The system of claim 1, wherein:
the plurality of threshold levels comprises a first threshold level and a second threshold level greater than the first threshold level;
the user interface device is to select the user command from a first set of one or more user commands responsive to the effective capacitance falling between the first threshold level and the second threshold level; and
the user interface device is to select the user command from a second set of one or more user commands responsive to effective capacitance exceeding the second threshold level.

6. The system of claim 1, further comprising:
a display system to receive the user command, the display system to modify an operation of the display system responsive to the user command.

7. The system of claim 6, further comprising:
an intermediary device wirelessly coupled to the user interface device and wirelessly coupled to the display system; and
wherein the user interface device is to wirelessly transmit the user command to the intermediary device and the intermediary device is to wirelessly transmit the user command to the display system.

8. A user interface device comprising:
a capacitive trackball assembly having:
a conductive trackball; and
a continuous conductive plate proximate to a surface of the conductive trackball that forms an annular ring around the conductive trackball;
a capacitive sense circuit coupled to the capacitive trackball assembly, the capacitive sense circuit to detect an effective capacitance of the capacitive trackball assembly, with the number of user contact points on the trackball to change the effective capacitance; and
a command controller coupled to the capacitive sense circuit, the command controller to select a user command from a plurality of user commands based on a relationship between the effective capacitance and a plurality of threshold levels, each threshold level representing a corresponding non-zero number of user contact points with the capacitive trackball assembly, the command controller to determine the number of user contact points on the trackball, along with a concurrent sensed rotation vector of the trackball from a rotation sensor, to identify the user command intended by the user from the plurality of user commands.

9. The user interface device of claim 8,
wherein the command controller is to provide the user command further based on the rotation vector.

10. The user interface device of claim 8, wherein:
the command controller is to select the user command from a first set of one or more user commands of the plurality of user commands responsive to the effective capacitance falling below a threshold level of the plurality of threshold levels; and
the command controller is to select the user command from a second set of one or more user commands of the plurality of user commands responsive to the effective capacitance exceeding the threshold level.

11. The user interface device of claim 8, wherein the plurality of threshold levels are adjustable.

12. The user interface device of claim 11, wherein the command controller is to dynamically adjust the plurality of threshold levels based on a noise calibration of the capacitive trackball assembly.

13. The user interface device of claim 8, wherein the conductive plate is coupled to an input of the capacitive sense circuit.

14. The user interface device of claim 8, wherein the conductive plate is coupled to a ground potential and the conductive trackball is coupled to an input of the capacitive sense circuit.

15. The user interface device of claim 8, wherein the user interface device comprises a portable user device having:
a housing containing the capacitive trackball assembly and the capacitive sense circuit, the housing comprising:
a first surface having a first opening, wherein a first hemispherical portion of a conductive trackball of the capacitive trackball is accessible via the first opening; and
a second surface opposite the first surface.

16. The user interface device of claim 15, wherein the housing further comprises:
a second opening at the second surface, wherein a second hemispherical portion of the conductive trackball is accessible via the second opening.

17. A method comprising:
determining an effective capacitance of a capacitive trackball assembly of a user interface device resulting from a user contact with a conductive trackball, the capacitive trackball assembly comprising the conductive trackball and a continuous conductive plate proximate to a surface of the conductive trackball that forms an annular ring around the conductive trackball;
determining a non-zero number of user contact points in contact with the conductive trackball based on the effective capacitance; and
determining the number of user contact points on the trackball, along with a concurrent sensed rotation vector of the trackball, to identify the user command intended by the user from the plurality of user commands.

18. The method of claim 17, further comprising:
selecting a user command from a plurality of user commands for transmission from the user interface device based on the number of user contact points.

19. The method of claim 18, further comprising:
transmitting the user command from the user interface device to a display system; and
modifying an operation of the display system based on the user command.

20. The method of claim 19, wherein transmitting the user command comprises:
wirelessly transmitting the user command from the user interface device to an intermediary device; and
wirelessly transmitting the user command from the intermediary device to the display system.

21. The method of claim 17, wherein determining the number of user contact points comprises:
determining the number of user contact points based on a relationship between the effective capacitance and a plurality of threshold levels, each threshold level associated with a different number of user contact points.

* * * * *